(12) United States Patent
Olsen

(10) Patent No.: US 6,895,683 B1
(45) Date of Patent: May 24, 2005

(54) CARPENTER'S LAYOUT TOOL

(76) Inventor: Michael D. Olsen, 137 Clark Fork Rd., Heron, MT (US) 59844

( * ) Notice: Subject to any disclaimer, the term of this patent is extended or adjusted under 35 U.S.C. 154(b) by 0 days.

(21) Appl. No.: 10/781,513

(22) Filed: Feb. 18, 2004

Related U.S. Application Data

(60) Provisional application No. 60/448,340, filed on Feb. 18, 2003.

(51) Int. Cl.[7] .................................................. G01B 3/04
(52) U.S. Cl. ............................. 33/562; 33/1 G; 33/474
(58) Field of Search .......................... 33/562, 520, 474, 33/476, 428–429, 456, 464, 481, 483, 403, 478, 494, 499, 485

(56) References Cited

U.S. PATENT DOCUMENTS

| | | | | |
|---|---|---|---|---|
| 3,371,420 A | * | 3/1968 | Pane, Jr. ......................... | 33/562 |
| 4,499,666 A | * | 2/1985 | Smith ............................. | 33/562 |
| 5,083,380 A | * | 1/1992 | Robertson ....................... | 33/562 |
| 5,090,129 A | * | 2/1992 | Cunningham .................. | 33/481 |
| 5,239,762 A | * | 8/1993 | Grizzell ......................... | 33/474 |
| 5,655,330 A | * | 8/1997 | Parsons, III .................... | 33/562 |
| 6,272,758 B1 | * | 8/2001 | Wheeler ......................... | 33/1 G |
| 6,293,028 B1 | * | 9/2001 | Sylvia ............................ | 33/613 |
| 2003/0051359 A1 | * | 3/2003 | Connor ........................... | 33/474 |

* cited by examiner

Primary Examiner—Christopher W. Fulton
Assistant Examiner—Yaritza Guadalupe
(74) Attorney, Agent, or Firm—Peter Loffler

(57) ABSTRACT

A carpenter's layout tool has various measurements thereon, which measurements are used during stud wall construction. The tool has a pair of feet, each with a centrally disposed opening, the feet being joined at a lower surface of each by a connecting bar. The connecting bar has measurements, both left justified and right justified, for joining corner marks, corner marks, and intersecting wall marks, using either 2x4 or 2x6 inch construction. The tool is dimensioned so that the feet provide stud spacing with one of the openings in the respective foot being used for measurement initialization.

20 Claims, 3 Drawing Sheets

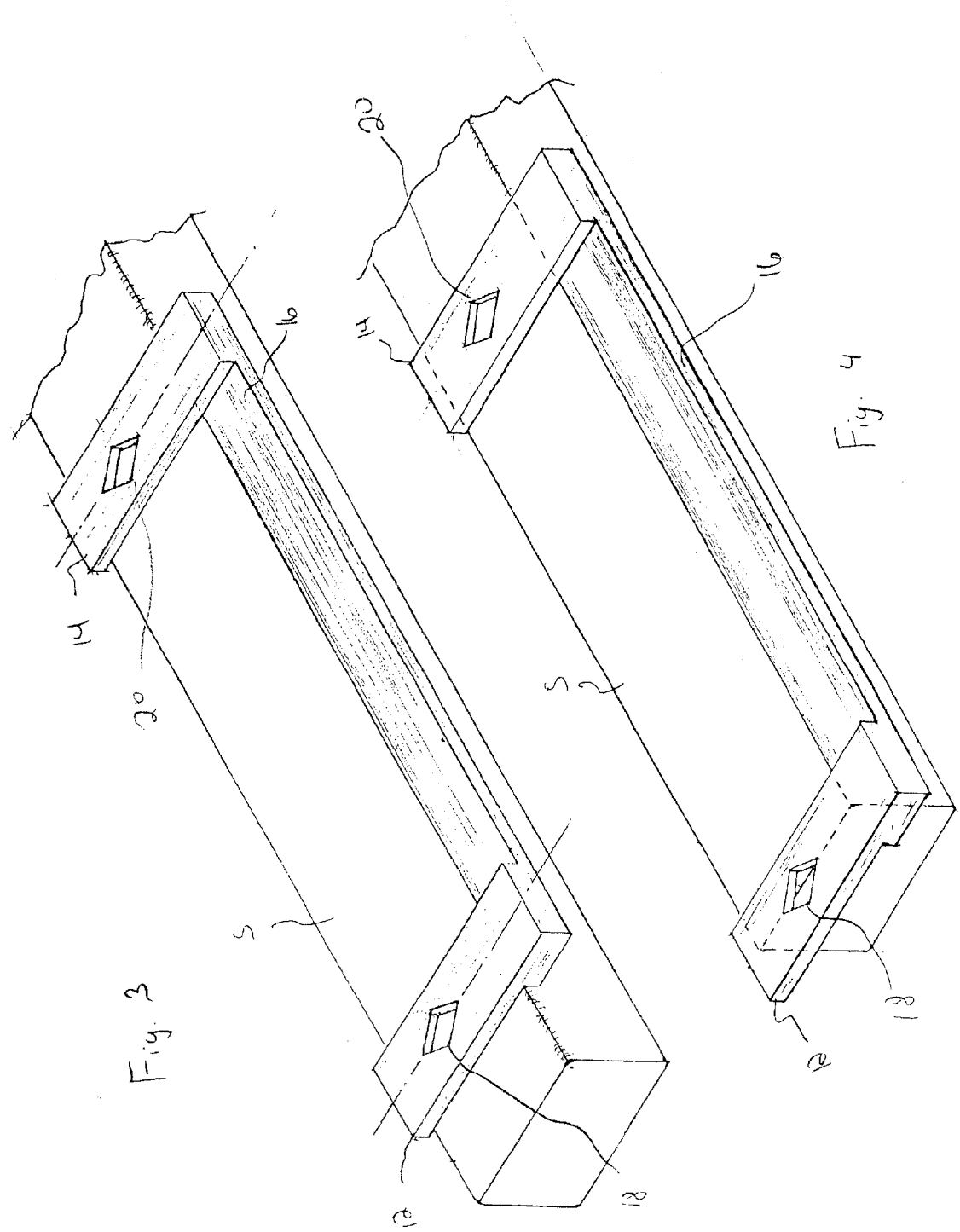

CARPENTER'S LAYOUT TOOL

This application claims the benefit of provisional patent application No. 60/448,340 filed on Feb. 18, 2003.

BACKGROUND OF THE INVENTION

1. Field of the Invention

The present invention relates to a layout tool for use by carpenters building a stud wall, the layout tool allowing the rapid taking of various standard measurements associated with building a stud wall using either 2×4 or 2×6 inch stud construction.

2. Background of the Prior Art

Building and raising stud walls forms the backbone of a frame carpenter's work description. Even a small house may have a dozen or more stud walls, both interior walls and exteriors wall, which need to be built and erected. As framing carpenters tend to be paid by the job and as, next to the foundation, the framed up walls form the basis upon which the other subcontractors perform their respective tasks, building the stud walls quickly and accurately is one of the goals of the framing carpenter.

The building of a stud wall has two main steps, measuring out the stud wall, and once so measured, building the actual wall and erecting it into place. The measuring process is typically done by the carpenter using a standard tape measure and making various marks along the base plate of the stud wall, the marks signifying the placement of studs, including corners and intersecting walls, to be attached to the base plate. This tried and true method is relatively efficient, however, it is not without problems. Mistakes in making measurements can and do happen, which mistakes can have a relatively high cost to rectify, especially if the mistake is not caught until after the stud wall is erected into place. Mistakes in measurement taking happen for a variety of reasons. For example, a carpenter who is building a 16 inch on center stud wall places the tape measure on the end of the base plate and makes marks every 16 inches by remembering what the various multiples of 16 are. The carpenter, having built countless other walls, instinctively remembers each of these multiples of 16 inches, however, mistakes in memory or calculations can be made, especially if a relatively inexperienced carpenter is performing the measurements or if a particularly long stud wall is being measured. Additionally, mistakes in memory can be made when measuring the stud wall for corner layout, joining corner wall layout, or intersecting wall layout, the mistakes typically being made from improper memory or simply using the wrong basis for the particular measureinent to be made (e.g., measuring out for a 2×4 inch intersecting wall when 2×6 inch construction is being employed). While measurement mistakes do not happen often, especially with an experienced crew, which crew tends to double check each measurement, the mistakes do happen, delaying the job and costing money.

Therefore, there exists a need in the art for a device that allows a carpenter to be able to make various measurements associated with building a stud wall, which measurements are highly accurate, and which device tends to minimize mistakes made from faulty memory or simple crew inexperience. Such a device must be quick and easy to use and must be relatively compact in size so as to allow a carpenter to be able to easily carry the device from job site to job site. Such a device must give the user a high degree of comfort in the measurements made so that the time-consuming process of rechecking each measurement need not take place.

SUMMARY OF THE INVENTION

The carpenter's layout tool of the present invention addresses the aforementioned needs in the art. The carpenter's layout tool provides a device that allows a carpenter to be able to make various measurements associated with building a stud wall (including stud spacing, joining corner layout, corner layout, and intersecting wall layout for both 2×4 inch and 2×6 inch construction), which measurements are highly accurate tending to minimize mistakes made from faulty memory or simple crew inexperience. The carpenter's layout tool is a simple device that is quick and easy to use and is relatively compact in size allowing a carpenter to be able to easily carry the device from job site to job site with other tools. The carpenter's layout tool gives the user a high degree of comfort iii the measurements made, eliminating the need for the time-consuming process of rechecking each measurement.

The carpenter's layout tool of the present invention is comprised of a left foot that has a first upper surface and a first lower surface while a right foot has a second upper surface and a second lower surface. A connecting bat connects the left foot with the right foot such that the connecting bar has various measurement marks thereon for taking various measurements whenever the tool is placed at a reference point. A left opening is located within the left foot while a right opening is located within the right foot and is located 16 inches from the left opening. The connecting bar is connected to the first lower surface of the left foot and the second lower surface of the right foot. The outer edge of the connecting bar has ruler markings thereon for taking spacing measurements. The measurement marks include a left joining corner mark, a left corner mark, a first left intersecting wall mark, a second left intersecting wall mark, a right joining corner mark, a right corner mark, a first right intersecting wall mark, and a second right intersecting wall mark. The left joining corner mark is located 2.75 inches from a first inner edge of the left foot, the left corner mark is located 4.5 inches from a first outer edge of the left foot, the first left intersecting wall mark is located 3.5 inches from the first inner edge of the left foot, the second left intersecting wall mark is located 7 inches from the first outer edge of the left foot, the right joining corner mark is located 2.75 inches from a second inner edge of the right foot, the right corner mark is located 4.5 inches from a second outer edge of the right foot, the first right intersecting wall mark is located 3.5 inches from the second inner edge of the right foot, and the second right intersecting wall mark is located 7 inches from the second outer edge of the right foot.

BRIEF DESCRIPTION OF THE DRAWINGS

FIG. 2 is a side elevation view of the carpenter's layout tool of the present invention.

FIG. 4 is an environmental view of the carpenter's layout tool being used to mark an initial point.

Similar reference numerals refer to similar parts throughout the several views of the drawings.

DESCRIPTION OF THE PREFERRED EMBODIMENT

Figure 1:
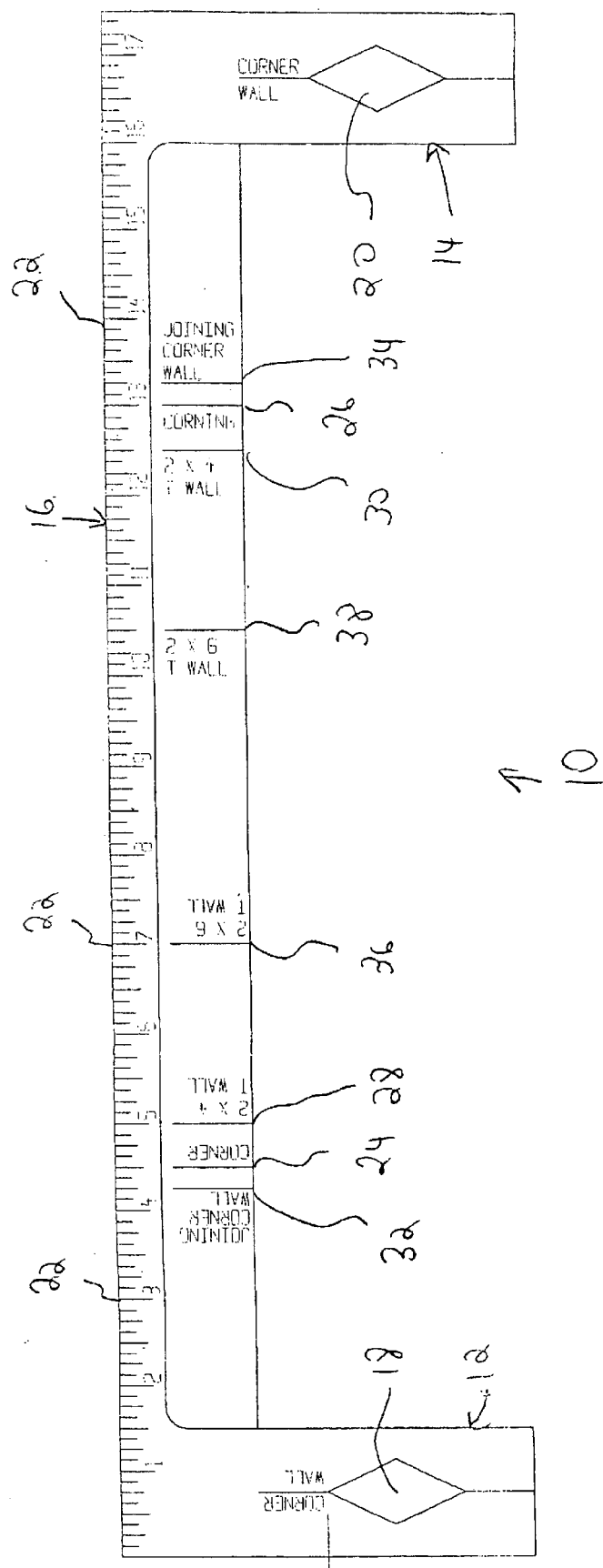
FIG. 1 is a top plan view of the carpenter's layout tool of the present invention.
Figure 3:
FIG. 3 is an environmental view of the carpenter's layout tool being used to mark a point.

Referring now to the drawings, it is seen that the carpenter's layout tool of the present invention, generally denoted by reference numeral 10, is comprised of a left foot 12 and a right foot 14 connected by a connecting bar 16. The left foot 12, right foot 14, which are similarly sized and shaped, and the connecting bar 16 are all made from an appropriate sturdy material such as steel, aluminum, or plastic. For standard stud wall construction, the width of each foot 12 and 14 should be 1.5 inches to correspond to the width of a standard stud.

A first diamond shaped opening 18 is located on the left foot 12 while a second diamond shaped opening 20 is located on the right foot 14, the two openings 18 and 20 being substantially similar in size and in spacing relative to the connecting bar 16 and each should be width centered within its respective foot. The central point of the two openings 18 and 20 is a fixed distance apart. For example, the central point of the two openings will be 16 inches apart for laying cut 16 inch on center studs, if the studs are to be 12 inches on center, then the central point of the two openings 18 and 20 is located 12 inches apart. Accordingly, the connecting bar 16 will be constructed of the appropriate length in order to achieve the desired separation of the central point of the two openings 18 and 20. Alternately, the connecting bar 16 can be telescoping so that the distance between the left foot 12 and the right foot 11 can be adjustable so as to achieve the desired separation on the two openings 18 and 20 on the respective foots 12 and 14. As a further alternative, a third foot, also having a diamond shaped opening thereon, can be located along the connecting bar 16 such that the separation between the central point of the opening 18 of the left foot 12 and the central point of the opening of the third foot for example, is 12 inches, and the separation between the central point of the opening 18 of the left foot 12 and the central point of the opening 20 of the right foot 14, for example, is 16 inches.

A plurality of ruler markings 22 are located along the lower edge of the connecting bar 16. A plurality of locator markings are located along the body of the connecting bar 16, These markings include a left corner line 24 (located 4.5 inches from the outer edge of the left foot 12) and a right corner line 26 (located 4.5 inches from the outer edge of the right foot 14) for use in laying out 2×4 inch studded corners, a first left intersecting wall line 28 (located 3.5 inches from the inner edge of the left foot 12) and a first right intersecting wall line 30 (located 3.5 inches from the inner edge of the right foot 14) for laying out 2×4 inch studded intersecting walls, a left joining corner line 32 (located 4.25 inches from the outer edge of the left foot 12) and a right joining corner line 34 (located 4.25 inches from the outer edge of the right foot 14) for use in laying out joining corners, and a second left intersecting wall line 36 (located 5.5 inches from the inner edge of the left foot 12) and a second right intersecting wall line 38 (located 5.5 inches from the inner edge of the right foot 14) for laying out 2×6 inch studded intersecting walls. The above measurements being for standard construction measurement techniques using standard sized studs.

In order to use the carpenter's layout tool 10 of the present invention, the tool 10 is placed on a stud wall SW that is to be marked out such that the opening 18 of the left foot 12 or is placed at the edge of the stud wall SW such that the edge of the stud wall SW extends between the top and bottom peaks of the opening 18 of the left foot 12. This leaves the right foot 14 at the location of the placement of the next stud in the stud wall. The user traces the width of right foot 14 at this point in order to mark the location for placement of the stud. Thereafter, the carpenter's layout tool 10 is moved so that the left foot 12 is positioned between the just traced width of the right foot 14 which acts as the new reference point. This moves the right foot 14 to the location of the placement of the next stud. The width of the right foot 16 is now traced and the process is repeated for the entire stud wall SW. In the above example, the stud wall was left justified, that is, the initial reference point for the stud wall SW was the left stud wall edge and successive markings were placed moving right. If the stud wall SW is to be right justified, then the opening 20 of the right foot is initially lined up at the right edge of the stud wall SW, and the width of the left foot 12 is used as the traced element for successive placement of studs.

As seen in FIG. 2, the connecting bar 16 is connects to the two feet 12 and 14 on their lower surface so that the when the device 10 is placed onto a stud wall, the two feet 12 and 14 rest flat on the surface of the stud wall SW to be marked while a side edge of the connecting bar 16 abuts against a side edge of the stud wall SW in order to achieve a snug positioning of the device 10 on the stud wall SW. This abutment of the connecting bar 16 against the stud wall also helps assure that the markings made by using the device are straight and not skewed. This also helps the user slide the tool 10 along the stud wall SW during stud wall marking.

Additionally, the feet 12 and 14 should extend a sufficient distance beyond the edge of the connecting bar 16 so that the feet 12 and 14 extend across the entire width of the stud wall SW to be marked. For example, if the stud wall uses a top plate and a sill plate and as the width of each plate is 3.5 inches, the feet 12 and 14 should extend at least 7 inches beyond the edge of the connecting bar 16.

The ruler markings 22 on the connecting bar 16 assist the user in taking standard measurements as needed.

If corners are to be marked out, then the left foot 14 (or the right foot 16) of the carpenter's layout tool 10 is placed at the reference point from where the measurement is to be taken and a mark is placed by the user at either the left corner line 24, or the left joining corner line 32 as needed. Alternately and in a similar fashion, the right foot 16 of the carpenter's layout tool 10 is placed at the reference point from where the measurement is to be taken and a mark is placed by the user at either the right corner line 26, or the right joining corner line 34 as needed.

If intersecting lines are to be marked out, then the left foot 14 (or the right foot 16) of the carpenter's layout tool 10 is placed at the reference point from where the measurement is to be taken and a mark is placed by the user at either the first left intersecting wall line 28, if 2×4 studs are being used to construct the intersecting wall, or the second left intersecting wall line 36 if 2×6 inch studs are being used to construct the intersecting wall. Alternately and in a similar fashion, the right foot 16 of the carpenter's layout tool 10 is placed at the reference point from where the measurement is to be taken and a mark is placed by the user at either the first right intersecting wall line 30, if 2×4 studs are being used to construct the intersecting wall, or the second right intersecting wall line 38 if 2×6 inch studs are being used to construct the intersecting wall.

While the invention has been particularly shown and described with reference to an embodiment thereof, it will be skilled in the art that various changes in be made without departing from the spirit and n.

I claim:

1. A layout tool comprising:
   a left foot having a first upper surface and a first lower surface;
   a right foot having a second upper surface and a second lower surface;

a connecting bar connecting the left foot with the right foot such that the connecting bar has various measurement marks thereon for taking various measurements whenever the tool is placed at a reference point, such that the measurement marks include a joining corner mark, a corner mark, a first intersecting wall mark, and a second intersecting wall mark; and wherein the joining corner mark is located 2.75 inches from an inner edge of the left foot, the corner mark is located 4.5 inches from an outer edge of the left foot, the first intersecting wall mark is located 3.5 inches from the inner edge of the left foot, and the second intersecting wall mark is located 7 inches from the outer edge of the left foot and/or wherein the joining corner mark is located 2.75 inches from an inner edge of the right foot, the corner mark is located 4.5 inches from an outer edge of the right foot, the first intersecting wall mark is located 3.5 inches from the inner edge of the right foot, and the second intersecting wall mark is located 7 inches from the outer edge of the right foot.

2. The layout tool as in claim 1 wherein the connecting bar is connected to the first lower surface of the left foot and the second lower surface of the right foot.

3. The layout tool as in claim 1 wherein an edge of the connecting bar has ruler markings thereon for taking spacing measurements.

4. The layout tool as in claim 1 wherein the measurement marks include a left measurement mark subset located proximate the left foot and the a right measurement mark subset located proximate the right foot, the left measurement mark subset being symmetrical with the right measurement mark subset about a central point of the connecting bar.

5. The layout tool as in claim 1 wherein the measurement marks include a left joining corner mark, a left corner mark, a first left intersecting wall mark, a second left intersecting wall mark, a right joining corner mark, a right corner mark, a first right intersecting wall mark, and a second right intersecting wall mark.

6. The layout tool as in claim 1 further comprising:
a left opening located within the left foot; and
a right opening located within the right foot.

7. The layout tool as in claim 6 wherein the left opening is located 16 inches from the right opening.

8. A layout tool comprising:
a left foot having a first upper surface and a first lower surface;
a right foot having a second upper surface and a second lower surface;
a connecting bar connecting the left foot with the right foot such that the connecting bar has various measurement marks thereon for taking various measurements whenever the tool is placed at a reference point, such that the measurement marks include a joining corner mark, a corner mark, a first intersecting wall mark and a second intersecting wall mark wherein the joining corner mark is located 2.75 inches from an inner edge of the left foot, the corner mark is located 4.5 inches from an outer edge of the left foot, the first intersecting wall mark is located 3.5 inches from the inner edge of the left foot, and the second intersecting wall mark is located 7 inches from the outer edge of the left foot and/or wherein the joining corner mark is located 2.75 inches from an inner edge of the right foot, the corner mark is located 4.5 inches from an outer edge of the right foot, the first intersecting wall mark is located 3.5 inches from the inner edge of the right foot, and the second intersecting wall mark is located 7 inches from the outer edge of the right foot;
a left opening located within the left foot; and
a right opening located within the right foot located 16 inches from the left opening.

9. The layout tool as in claim 8 wherein the connecting bar is connected to the first lower surface of the left foot and the second lower surface of the right foot.

10. The layout tool as in claim 8 wherein an edge of the connecting bar has ruler markings thereon for taking spacing measurements.

11. The layout tool as in claim 8 wherein the measurement marks include a left measurement mark subset located proximate the left foot and the a right measurement mark subset located proximate the right foot, the left measurement mark subset being symmetrical with the right measurement mark subset about a central point of the connecting bar.

12. The layout tool as in claim 8, wherein the measurement marks include a left joining corner mark, a left corner mark, a first left intersecting wall mark, a second left intersecting wall mark, a right joining corner mark, a right corner mark, a first right intersecting wall mark, and a second right intersecting wall mark.

13. A layout tool comprising:
a left foot having a first upper surface and a first lower surface;
a right foot having a second upper surface and a second lower surface;
a connecting bar connecting the left foot with the right foot such that the connecting bar has various measurement marks thereon for taking various measurements whenever the tool is placed at a reference point;
a left opening located within the left foot;
a right opening located within the right foot; and
wherein the left opening is located 16 inches from the right opening.

14. The layout tool as in claim 13 wherein the connecting bar is connected to the first lower surface of the left foot and the second lower surface of the right foot.

15. The layout tool as in claim 13 wherein an edge of the connecting bar has ruler markings thereon for taking spacing measurements.

16. The layout tool as in claim 13 wherein the measurement marks include a left measurement mark subset located proximate the left foot and the a right measurement mark subset located proximate the right foot, the left measurement mark subset being symmetrical with the right measurement mark subset about a central point of the connecting bar.

17. The layout tool as in claim 13, wherein the measurement marks include a joining corner mark, a corner mark, a first intersecting wall mark, and a second intersecting wall mark.

18. The layout tool as in claim 17 wherein the joining corner mark is located 2.75 inches from an inner edge of the left foot, the corner mark is located 4.5 inches from an outer edge of the left foot, the first intersecting wall mark is located 3.5 inches from the inner edge of the left foot, and the second: intersecting wall mark is located 7 inches from the outer edge of the left foot or wherein the joining corner mark is located 2.75 inches from an inner edge of the right foot, the corner mark is located 4.5 inches from an outer edge of the right foot, the first intersecting wall mark is located 3.5 inches from the inner edge of the right foot, and the second intersecting wall mark is located 7 inches from the outer edge of the right foot.

19. The layout tool as in claim 13 wherein the measurement marks include a left joining corner mark, a left corner mark, a first left intersecting wall mark, a second left intersecting wall mark, a right joining corner mark, a right corner mark, a first right intersecting wall mark, and a second right intersecting wall mark.

20. The layout tool as in claim 13 wherein the left joining corner mark is located 2.75 inches from a first inner edge of the left foot, the left corner mark is located 4.5 inches from a first outer edge of the left foot, the first left intersecting wall mark is located 3.5 inches from the first inner edge of the left foot, the second left intersecting wall mark is located 7 inches from the first outer edge of the left foot, the right joining corner mark is located 2.75 inches from a second inner edge of the right foot, the right corner mark is located 4.5 inches from a second outer edge of the right foot, the first right intersecting wall mark is located 3.5 inches from the second inner edge of the right foot, and the second right intersecting wall mark is located 7 inches from the second outer edge of the right foot.

* * * * *